(No Model.)
C. P. ROGERS & L. ALLEN.
FRUIT DRIER.
No. 325,360. Patented Sept. 1, 1885.
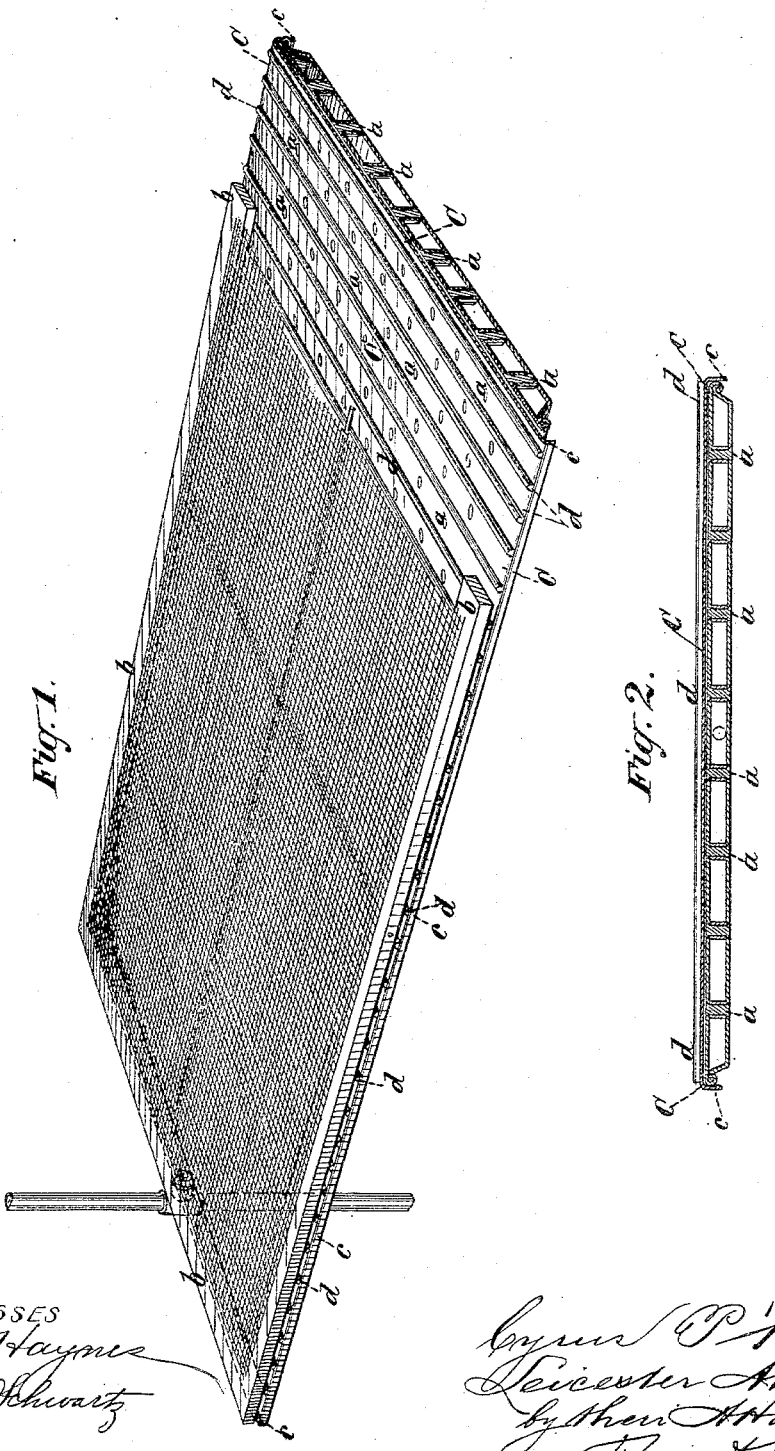
WITNESSES
INVENTOR

UNITED STATES PATENT OFFICE.

CYRUS P. ROGERS, OF FREDERICA, DELAWARE, AND LEICESTER ALLEN, OF NEW YORK, N. Y., ASSIGNORS TO THE STEAM HEAT EVAPORATOR COMPANY, OF CHARLOTTE, MICHIGAN.

FRUIT-DRIER.

SPECIFICATION forming part of Letters Patent No. 325,360, dated September 1, 1885.

Application filed October 31, 1884. (No model.)

*To all whom it may concern:*

Be it known that we, CYRUS P. ROGERS, of Frederica, in the county of Kent and State of Delaware, and LEICESTER ALLEN, of the city and county of New York, in the State of New York, have jointly invented an Improvement in Fruit-Driers; and we do hereby declare that the following is a full, clear, and exact description of the same, reference being had to the accompanying drawings, forming part of this specification.

Our improvement relates to that class of fruit-driers which employ steam as a conveyer of heat, which heat is radiated to the fruit, causing the latter to give off its moisture in the form of vapor to circulating air-currents; and it relates more particularly to that class of fruit-driers which employ hollow flat shelves arranged in series for supporting trays of fruit to be dried, and for receiving the steam, which imparts heat to the fruit through the medium of the hollow shelves, the latter being ordinarily styled "pans."

More strictly, our invention is an improvement on the fruit-drier a patent for which was granted to Frank S. Belcher and John B. Belcher, dated October 2, 1883, and numbered 285,957, and upon such modifications of the same as since that date may have been made or patented.

Our invention will be better understood by a brief description of some features of the fruit-drier to the patent of which we have referred and a statement of the practical defects in its operation on some kinds of fruits which it is the object of our invention to remove. In such description and statement reference will be had to the accompanying drawings, in which—

Figure 1 is a perspective and partly-sectional view of a steam-pan or hollow shelf (such as is used in the class of driers under consideration) with our improvement thereunto attached, and a fruit-tray of the kind in ordinary use in this kind of drier, supported on the pan or shelf. Fig. 2 is a vertical cross-section through such a steam-pan or hollow shelf having our improvement attached.

These hollow shelves or pans are usually made of galvanized sheet-iron, the upper and lower walls of which are supported both against bursting and collapsing pressure by stays $a$, Fig. 1, inserted at frequent intervals and riveted to both the top and bottom walls. The pans are placed in series, one over another, in a supporting frame-work, and to gain the required compactness of arrangement, as well as to secure the highest degree of effectiveness, they are placed quite near together, generally so near together that at most only two trays of fruit can be slid in between them.

The trays usually consist of a rectangular wooden frame, $b$, Fig. 1, upon the bottom of which is fastened and stretched galvanized-iron wire-gauze for supporting the fruit, the wooden frames projecting downward somewhat below the gauze to keep the latter from resting directly on the steam-pans.

In use, the trays holding the fruit are slid in directly upon the heated pans or shelves, the latter having an inclination inwardly and upwardly toward the middle of the frame-work which supports the pans, so that the vapor rising from the tray on one pan impinges against the bottom of the pan next above it, and passing inwardly with the air-currents naturally set up passes out at the center of the apparatus without coming in contact with any other fruit in the drier. This arrangement is essential to the effectiveness of the apparatus; but it also increases one of the defects in the operation of this kind of drier on certain kinds of fruits, which it is the object of our invention to remove.

These driers, as hitherto constructed and as above described, have worked very perfectly in drying apples and various other fruits and substances; but being applied to drying peaches in halves, which form is preferable for market, the following defects in their operation became apparent: The weight of the fruit, together with the expansion of the wire-gauze of the tray by heating, causes the gauze to sag so much as to come in contact with the hollow shelves or pans, and are much injured, both in appearance and quality. The gumming of the trays or pans, which causes loss of time in cleansing, interruption of the process, and injury to the fruit, is also another difficulty in applying this class of driers to evaporation of peaches and other very heavy, juicy fruits.

Our invention, which wholly removes these defects and renders the operation of this kind of driers on peaches almost absolutely perfect, both as regards quality of the product and quantity of work which can be performed, consists partly in a combination, with a steam-pan of a fruit-drier, of an attachable and detachable metallic shield, which protects the pan from any accumulation of concreted juice, and upon which the juice collects, and which may at any time be removed for washing without stopping or interfering with the continuous operation of the driers.

It further consists in the combination, with a steam-pan of a fruit-drier, of an attachable and detachable shield provided with means for holding it in proper relation with the pan and with rigidly-attached supports for the gauze of the steam-pans, whereby both the shield and the supports may be simultaneously removed from or placed upon the steam-pan in proper relation therewith.

It also consists in the combination, with the steam-pan, of an attachable shield of the novel construction hereinafter described, for the purpose hereinafter set forth.

In carrying out our invention, although we do not limit ourselves to any precise details of construction so far as relates to the form of the supports for the trays or the means of holding the shield in proper relation with the steam-pan, or in the mode of attaching the supports for the trays to the shields, we yet prefer the construction shown in the drawings, which we now proceed to describe.

C, Figs. 1 and 2, is the shield, preferably formed of a flat plate of galvanized sheet-iron, with its front and back edges turned downward, as shown at c. The plate is large enough to cover the whole of such portion of a pan as underlies one fruit-tray. It will be seen that the front and back turned-down edges are means for holding the shield in relation with the pan so securely that the position of the shield relatively to the pan cannot be disturbed by the sliding out and in of the fruit-tray on the shield, and also that the shield can be readily removed for washing and as easily replaced, only one extra shield being required to replace any shield taken out for washing, and that by the use of such shields the operation of the drier need never be interrupted for washing purposes.

The supports for the trays may be made separately attachable and detachable from the shields and provided with means for attaching them in proper relation with the shields or pans; but we prefer to permanently affix them transversely to the upper surface of the shields, as shown in the drawings at d; and we prefer to make them of half-round galvanized-iron wire, with the flat sides of the wires soldered to the shields. Wires of about one-eighth inch radius, placed about seven inches apart and arranged in parallel relation across the upper surface of the shield, have been found to answer an excellent purpose. Placing the convex side of these supports uppermost makes the surface of metallic contact of the supports with the gauze of the trays so slight that not enough heat can be conducted to the gauze to discolor the fruit or otherwise injure it.

Soldering the supports to the shields is not only a cheap and permanent means of attachment, but this method obviates any holes or recesses under the supports in which the concreted juice or other foreign matter can accumulate. Thus attached they also expand and contract equally with the shields, and as the latter are in close contact with the pans and are made of the same material as the pans they not only expand and contract equally with the pans, but their effect upon the transmission of heat and the rate of drying is inappreciable. Wires attached by their ends to the wooden frames of the trays on the under side will not prevent sagging, because they expand much more than the wood, and their expansion alone will make them sag, even when they have no burden of fruit to carry. Such wires also greatly obstruct the needful washing of the trays when they become gummed.

The placing of the supports laterally across the upper sides of the inclined pans or trays leaves between the supports channels or passages for the free circulation of air under the gauze of the trays, and also conducts any water used in washing the pans freely to the outer edges of the pans instead of obstructing the flow, as would be the case if the supports were placed longitudinally.

Having thus described our invention, what we consider as our invention, and desire to protect by Letters Patent, is expressed in the following claims:

1. The combination, with a steam-pan of a fruit-drier, of an attachable and detachable shield for protecting the pan from the accumulation of concreted fruit-juice, substantially as herein described, and for the purpose set forth.

2. The combination, with a steam-pan of a fruit-drier, of an attachable and detachable shield provided with means for holding such shield in proper relation with the steam-pan, and with rigidly-attached supports for the gauze of fruit-trays, substantially as and for the purposes set forth.

3. The combination, with a steam-pan of a fruit-drier, of an attachable and detachable shield for the protection of the pan from juice extracted from fruit, which shield has its front and back edges turned down over the front and back edges of the pan for holding the shield in proper relation with the pan, and for preventing air-currents from passing between the shield and pan, substantially as and for the purposes described.

CYRUS P. ROGERS.
     LEICESTER ALLEN.

Witnesses to the signature of Leicester Allen:
 FREDK. HAYNES,
 EMIL SCHWARTZ.

Witnesses to the signature of Cyrus P. Rogers:
 R. C. AVERY,
 JAMES W. BETHARD.